Patented June 5, 1951

2,555,304

UNITED STATES PATENT OFFICE 2,555,304

IMPROVING THE ADHESION OF RUBBER TO CELLULOSIC FIBROUS MATERIALS

Fred S. Perkerson, La Grange, Ga., assignor, by mesne assignments, to Callaway Mills Company, La Grange, Ga., a corporation of Georgia No Drawing. Application August 17, 1946, Serial No. 691,391

8 Claims. (Cl. 154—139)

This invention relates to improvements in the bonding of rubber with cellulosic fibrous materials, e. g., cotton or rayon.

More particularly, the invention relates to improvements in the bonding of rubber compositions to cotton and rayon fabrics used in tire carcasses and tire manufacture where adhesion of the vulcanized rubber composition and the tire fabric is important and with resulting improvement in the resulting cotton-rubber or rayon-rubber bond and increased serviceability of the tires.

According to the present invention, the fibrous materials such as cotton or rayon cords and fabrics used in tire construction are pretreated with dialkyl esters of an alpha-beta unsaturated dicarboxylic acid to increase the adhesion of the fibrous material to rubber when vulcanizable rubber compositions are applied to the fibrous material and vulcanized.

The fibrous materials used according to the invention include various cellulosic fibrous materials to which it is desirable to impart improved adhesion with rubber. The invention is of special advantage in connection with tire fabrics of cotton and rayon and including both cords and cord fabrics and woven fabrics of cotton and rayon, etc.

The invention includes the improved process in which improved adhesion of rubber to fibrous materials is obtained with the use of such dialkyl esters of an alpha-beta unsaturated dicarboxylic acid and the final composite vulcanized product.

The conjugated or alpha-beta unsaturated esters used in the present invention are advantageously non-volatile compounds, non-volatile at the vulcanization temperature. The alpha-beta unsaturated compounds which are advantageously used in the invention are those containing the acrylyl or substituted acrylyl group.

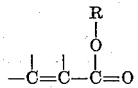

in which R is an alkyl radical forming part of the ester group. Compounds which are particularly advantageous are dialkyl esters of maleic acid or itaconic acid, e. g., diethyl maleate, dimethyl itaconate, etc.

A fabric or cord, etc. can be pretreated with such compounds in solution. An alternative and advantageous method of applying the compounds in the pretreatment of the fabrics or cords is to add the compound to an adhesive solution of rubber or rubber cement and apply this adhesive solution to the fibrous material with subsequent removal of solvent.

Accordingly, in carrying out the invention, the cords, fabrics, mats or other forms of the fibrous material may be immersed in a solution of the compound in a suitable solvent and the solvent then removed by evaporation, followed by applying a vulcanizable rubber composition to the pretreated fibrous material and vulcanizing to give vulcanized articles having an increased bond between the rubber and fibrous material. In many cases, still greater increase in the strength of the bond may be obtained by a similar pretreatment in which the treating compound is dissolved or dispersed in a solution of the rubber.

The rubber compositions which are bonded to the fibrous material will vary with the character of products to be produced. Such rubber compositions are well known in the art and are illustrated, for example, by so-called squeegee stocks and tire carcass stocks in which the rubber is compounded with vulcanizing agents, accelerators, plasticizers, pigments, etc. with the particular formula varying somewhat with different tires and other products. The rubber compositions may be of natural rubber or of synthetic rubber.

I have found it important with some of the compounds to use catalysts and particularly peroxide catalysts and that materially improved results have been obtained when such catalysts are used.

The treatment of the fibrous material with the alpha-beta unsaturated esters enables improved adhesion between the fibrous material and the rubber composition to be obtained on vulcanization, particularly when peroxide catalysts are also used. The impregnation of the fibrous material with such compounds, and particularly with an adhesive cement containing such compounds, gives an improved treated fabric which enables improved adhesion to be obtained between the fabric and the rubber composition subsequently applied thereto when vulcanized. The resulting composite product made with the treated fabric and with the application of vulcanizable rubber compositions followed by vulcanization is an improved product characterized by improved adhesion between the vulcanized rubber and the treated fabric.

The advantages of the invention are illustrated by a comparison of the final vulcanized products made according to the invention with products similarly made of untreated fibrous material.

The improved products of the present invention show greatly increased bonding strength between the rubber and fibrous material when subjected to the "type H" adhesion test described by Lyons, Nelson and Conrad in U. S. Department of Agriculture Booklet AIC-99.

The invention will be further illustrated by the following examples but it will be understood that the invention is not limited thereto.

*Example 1.*—A rubber solution was prepared from 25 parts of rubber cement (a benzene solution containing 7% of rubber) and 25 parts of benzene, and this solution was used as the control.

Solutions were also prepared of the following composition, the parts being by weight:

25 parts rubber cement
24 parts benzene
1 part diethyl maleate
0.05 part ascaridole 25 parts rubber cement
23.9 parts benzene
1.0 part diethyl maleate
0.10 part benzoyl peroxide Samples of 275/4/3 rayon tire cord were passed four times through the respective adhesives or solutions, removing the excess and drying after each application.

The cords so treated were prepared into "type H" test specimens by applying a natural rubber tire carcass stock and curing, and the resulting products were tested with the following average results (each figure being the average of forty tests):

In the case of the control, 6.62 lbs.; with the first composition above, 7.30 lbs.; and with the second composition above, 8.26 lbs.

In this example the ascaridole and the benzoyl peroxide serve as catalysts.

*Example 2.*—Particularly advantageous results have been obtained with the use of dimethyl itaconate which is a compound having the alpha-beta unsaturated group and which has a terminal vinyl group which is generally more reactive than other ethylenic double bonds.

Samples of 275/4/3 rayon tire cord were treated as in the previous example with four solutions or cements having the following composition:

No. 1 (control):
25 parts rubber cement
25 parts benzene

No. 2:
25 parts rubber cement
24 parts benzene
1.0 part dimethyl itaconate

No. 3 (control B):
25 parts rubber cement
24.9 parts benzene
0.10 part benzoyl peroxide No. 4:
25 parts rubber cement
24 parts benzene
1.0 part dimethyl itaconate
0.1 part benzoyl peroxide The treated cords were prepared into "type H" test specimens using a synthetic rubber Buna S tire carcass stock and tested with the following average results:

No. 1 (control) _____ 5.41 lbs.
No. 2 (ester alone) _____ 5.66 lbs.
No. 3 (catalyst alone) _____ 7.30 lbs.
No. 4 _____ 9.30 lbs. (+72%)

These results show that the combined use of the catalyst with the ester gives markedly improved results over those obtained with either the ester alone or the catalyst alone. Other catalysts can be used, particularly peroxide catalysts.

In a similar manner other esters and particularly dialkyl esters of other alpha-beta unsaturated dicarboxylic acids can be used.

It will be understood that variations and modifications can be made in the invention and that the invention is not limited to the specific illustrative examples given.

I claim:

1. The method of improving the adhesion of rubber to cellulosic fibrous materials which comprises applying to said materials a dialkyl ester of an alpha-beta unsaturated dicarboxylic acid, applying compounded vulcanizable rubber to the treated material and vulcanizing the rubber.

2. The method according to claim 1 in which the ester is applied to the cellulosic fibrous material in the form of an adhesive containing rubber dissolved in a volatile solvent.

3. The method according to claim 1 in which the ester is a dialkyl ester of itaconic acid.

4. The method according to claim 3 in which the ester is dimethyl itaconate.

5. The method according to claim 1 in which the ester is a dialkyl ester of maleic acid.

6. The method according to claim 5 in which the ester is diethyl maleate.

7. The method according to claim 1 in which the ester is applied to the cellulosic fibrous material together with a peroxide catalyst.

8. A composite vulcanized rubber product including cellulosic fibrous material bonded to vulcanized rubber, the fibrous material being pretreated before vulcanization with a dialkyl ester of an alpha-beta unsaturated dicarboxylic acid, said vulcanized product being characterized by improved adhesion between the fibrous material and the vulcanized rubber.

FRED S. PERKERSON.

REFERENCES CITED

The following references are of record in the file of this patent:

UNITED STATES PATENTS

| Number | Name | Date |
|---|---|---|
| 1,899,535 | Teague | Feb. 28, 1933 |
| 2,349,290 | Loughborough | May 23, 1944 |
| 2,360,946 | Hershberger | Oct. 24, 1944 |
| 2,364,158 | Mitchell | Dec. 5, 1944 |
| 2,380,184 | Marple | July 10, 1945 |
| 2,418,633 | Gould | Apr. 8, 1947 |
| 2,439,514 | Herndon | Apr. 13, 1948 |
| 2,439,953 | Swiss et al. | Apr. 20, 1948 |
| 2,443,613 | Fuller | June 22, 1948 |
| 2,443,736 | Kropa | June 22, 1948 |
| 2,445,553 | Beavers | July 20, 1948 |
| 2,479,486 | Gerhart | Aug. 16, 1949 |
| 2,489,985 | Speight, Jr. | Nov. 29, 1949 |

FOREIGN PATENTS

| Number | Country | Date |
|---|---|---|
| 120,423 | Austria | Dec. 27, 1930 |
| 546,690 | Germany | Mar. 14, 1932 |